Figure 1A:
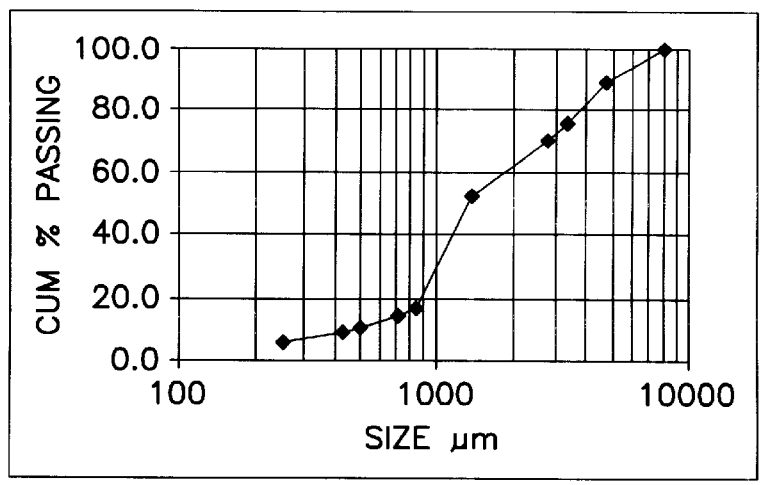

United States Patent
Innes

[11] Patent Number: 6,146,441
[45] Date of Patent: Nov. 14, 2000

[54] REDUCING IRON OXIDES IN ROTARY HEARTH FURNACE

[75] Inventor: John Alexander Innes, Melbourne, Australia

[73] Assignee: Technological Resources Pty Ltd, Melbourne, Australia

[21] Appl. No.: 09/011,305

[22] PCT Filed: Aug. 7, 1996

[86] PCT No.: PCT/AU96/00496

§ 371 Date: Jun. 5, 1998

§ 102(e) Date: Jun. 5, 1998

[87] PCT Pub. No.: WO97/06281

PCT Pub. Date: Feb. 20, 1997

[30] Foreign Application Priority Data

Aug. 7, 1995 [AU] Australia .............................. PN 4616

[51] Int. Cl.[7] .................................................. C21B 13/10
[52] U.S. Cl. .................................. 75/484; 75/500; 75/961
[58] Field of Search ........................... 75/484, 485, 500, 75/501, 961; 266/160

[56] References Cited

U.S. PATENT DOCUMENTS

| | | |
|---|---|---|
| 1,452,627 | 4/1923 | Thornhill .................................. 75/484 |
| 3,890,138 | 6/1975 | Hockin . |
| 4,701,214 | 10/1987 | Kaneko et al. . |
| 4,971,622 | 11/1990 | Slatter ........................................ 75/561 |
| 5,169,307 | 12/1992 | Frye ............................................ 432/14 |
| 5,637,133 | 6/1997 | Munnix et al. ............................ 75/484 |
| 5,730,775 | 3/1998 | Meissner et al. .......................... 75/436 |

FOREIGN PATENT DOCUMENTS

| | | |
|---|---|---|
| 1-36707 | 2/1989 | Japan . |
| 1214626 | 12/1970 | United Kingdom . |

*Primary Examiner*—Roy V. King
*Assistant Examiner*—Tima McGuthry-Banks
*Attorney, Agent, or Firm*—Merchant & Gould P.C.

[57] ABSTRACT

A process for at least partially reducing iron oxides comprises forming a bed of reactants on a hearth of a rotary hearth furnace, the reactants comprising (a) mixture of iron ore fines and particulate carbonaceous material and/or (b) micro-agglomerates of iron ore fines and particulate carbonaceous material. The mixture and/or the micro-agglomerates are heated in the rotary hearth furnace to at least reduce the iron oxides. The "micro-agglomerates" are agglomerates that are less than 1400 microns (and preferably more than 500 microns) in diameter. The at least partially reduced product is preferably used in the production of metallic iron. An apparatus for at least partially reducing iron oxides is also claimed. The process permits operation of the rotary hearth furnace without requiring pelletisation of iron oxides fines and coal.

3 Claims, 1 Drawing Sheet

REDUCING IRON OXIDES IN ROTARY HEARTH FURNACE

This application is a national stage of PCT/AU96/00496 filed Aug. 7, 1996.

The present invention relates to a process for partially reducing iron oxides in a rotary hearth furnace.

A known rotary hearth-based process for partially reducing iron oxides is the FASTMET process of Midrex Steel Corporation. A particular form of the FASTMET process is described in U.S. Pat. No. 4,701,214 in the name of Kaneko et al (assigned to Midrex International BV Rotterdam).

The FASTMET process as described in the technical literature, including the U.S. patent, comprises the steps of:

(i) agglomerating a mixture of iron oxide fines, pulverised coal, and a binder to form pellets that typically are of the order of 20 mm diameter (a preferred range of 10–25 mm is disclosed in the U.S. patent);

(ii) feeding the pellets to a rotary hearth furnace to form a shallow bed of one to three layers deep on a hearth of the rotary hearth furnace, typically with an intermediate layer of iron ore separating the pellets from the furnace hearth to protect the hearth;

(iii) heating the pellets in the rotary hearth furnace from above the hearth to a temperature of 1100–1370° C. to reduce the iron oxides to metallic iron.

The technical literature reports that the FASTMET process has achieved metallisation of the order of 90%.

The reduced pellets produced in the FASTMET process may be used to produce pig iron or steel in a range of equipment such as electric arc furnaces and HIsmelt smelt reduction vessels.

An advantage of the FASTMET process is that it operates with iron ore fines and coal fines. The use of iron ore fines and coal fines is a desirable objective because iron ore fines are inexpensive and cannot be used in a number of other processes and coal is relatively inexpensive compared with coke.

An object of the present invention is to provide a process for at least partially reducing iron oxides in a rotary hearth furnace which is an improvement of the FASTMET process.

According to the present invention there is provided a process for at least partially reducing iron oxides, which process comprises:

(i) forming a bed of reactants on a hearth of a rotary hearth furnace, the reactants comprising (a) a mixture of iron ore fines and particulate carbonaceous material and/or (b) micro-agglomerates of iron ore fines and particulate carbonaceous material; and (ii) heating the mixture and/or the micro-agglomerates in the rotary hearth furnace to at least partially reduce the iron oxides.

The present invention is based on the realisation that it is not necessary to pelletise iron oxide fines and coal to operate a rotary hearth furnace efficiently and effectively. It is evident from the technical literature that the FASTMET process depends on the use of pellets. The elimination of the pelletising step simplifies considerably the process and could significantly increase productivity and reduce capital and operating costs.

The term "micro-agglomerates" is understood herein to mean agglomerates that are less than 1400 microns (and preferably more than 500 microns) in diameter.

It is preferred that micro-agglomerates form a substantial proportion of the bed of reactants.

It is preferred that the metallisation of the product produced in step (ii) be at least 50%.

The mixture of iron ore fines and carbonaceous material may be formed prior to feeding the mixture to the rotary hearth furnace.

Alternatively, the iron ore fines and carbonaceous material may be supplied separately to the rotary hearth furnace and the mixture formed in situ on the hearth.

The carbonaceous material may be any suitable material, such as coal.

It is preferred that the carbonaceous material be coal.

It is preferred that the coal be pulverised.

The micro-agglomerates may be formed by any suitable means.

The bed of reactants on the rotary hearth furnace may be of any suitable depth. Typically, the depth of the bed is of the order of 20–25 mm.

According to the present invention there is also provided an apparatus for at least partially reducing iron oxides, which apparatus comprises:

(i) a means for forming micro-agglomerates of iron ore fines and particulate carbonaceous material, and (ii) a rotary hearth furnace for at least partially reducing the iron oxide of micro-agglomerates produced by the micro-agglomerate forming means.

The at least partially reduced product produced by the process and the apparatus of the present invention may be used in a range of applications. A preferred, although by no means exclusive, application is in the production of metallic iron.

In order to evaluate the present invention the applicant carried out two separate experimental programs on:

(i) a mixture of iron ore fines and coal;

(ii) micro-agglomerates of iron ore fines, coal, and a bentonite binder; and (iii) for the purpose of comparison with the FASTMET process, pellets of iron ore fines, coal, and the binder.

The raw materials for the first experimental program were Yandicoogina iron ore, Yarrabee anthracite coal, and bentonite binder.

Figure 1B:
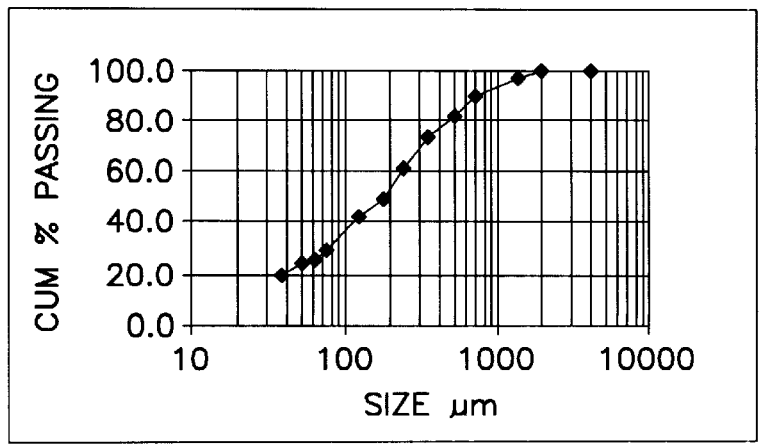

The analyses of the iron ore and coal are set out in Table 1 and particulate size distributions are provided in FIGS. 1*a* and 1*b*.

TABLE 1

| 1. Yandicoogina Iron Ore | | | | |
|---|---|---|---|---|
| % Fe | % $Al_2O_3$ | % $SiO_2$ | % P | *% LOI |
| 57.4 | 1.25 | 4.84 | 0.06 | 11.45 |

*LOI - loss of ignition

| 2. Yarrabee Anthracite Coal (Approximate) | | | |
|---|---|---|---|
| % Fixed C | % Ash | % Moisture | % Volatiles |
| 78.7 | 10.0 | 1.8 | 9.5 |

It is noted that the above percentages are by weight.

The pellets for the first experimental program were prepared by mixing iron ore fines, coal, and bentonite in the following proportions, by weight.

iron ore fines: 79.25% coal: 19.25% bentonite: 1.5%

The mixture was placed in a rotating disc pelletiser and water was sprayed onto the cascading material, causing agglomeration. As the pellets formed, the pellets were removed and oven dried at 110° C. Pellets less than 16 mm were screened out. The size range of the remaining pellets was representative of pellets used in the FASTMET process.

The micro-agglomerates for the first experimental program were prepared from the same feed mix as the pellets. The feed mix and water were placed in a Eirich mixer, and the mixer was operated to produce micro-agglomerates of the order of 1 mm in diameter. The micro-agglomerates were removed from the mixer and oven-dried at 110° C. The dried micro-agglomerates were screened and material in the size range of 500–1400 micron was collected.

The mixture of iron ore fines and coal for the first experimental program was prepared by hand mixing in the proportions by weight of 80% iron ore fines and 20% coal.

The combined feed assays for the mixture of iron ore fines and coal, micro-agglomerates, and pellets are set out in Table 2.

TABLE 2

| Combined Feed Assays | | | |
|---|---|---|---|
| Feed | % Fe$^T$ | % C | % S |
| Mixed | 46.8 | 16.6 | 0.16 |
| Micro-agglomerates | 45.5 | 16.2 | 0.14 |
| Pellets | 45.5 | 16.2 | 0.14 |

The first experimental program was carried out in a high temperature electrically heated furnace.

Samples of the mixture of iron ore fines and coal, the micro-agglomerates, and the pellets were placed in a tray in the furnace for periods of time between 5 and 120 minutes. The tray was loaded with a monolayer of pellets of a 25 mm deep bed of micro-agglomerates or a 25 mm deep bed of the mixture of iron ore fines and coal.

The furnace was operated at a temperature of 1200° C. A gas mixture of carbon monoxide and air was blown into the furnace from above the sample tray to simulate combustion gases and excess air in a rotary hearth furnace in accordance with standard operating conditions of the FASTMET process.

The experimental products from the furnace were assayed for total iron, metallic iron, carbon, and sulphur. In addition, a visual inspection was made of samples to determine whether gas penetration was achieved. The results of the first experimental program are set out in Table 3.

TABLE 3

| Sample No. | Time (mins) | Feed Material | Assays % Fe$^T$ | % Fe$^{met}$ | C(%) | S(%) | % Metal'n |
|---|---|---|---|---|---|---|---|
| 1 | 6 | Mixed | 50.2 | 0.5 | 15.5 | 0.12 | 1.0 |
| 2 | 10 | Mixed | 54.1 | 1.5 | 14.8 | 0.13 | 2.8 |
| 3 | 14 | Mixed | 54.7 | 0.9 | 14.9 | 0.13 | 1.6 |
| 4 | 29 | Mixed | 65.1 | 27.0 | 10.8 | 0.13 | 41.5 |
| 5 | 33 | Mixed | 71.1 | 46.2 | 7.0 | 0.17 | 64.9 |
| 6 | 60 | Mixed | 72.9 | 47.7 | 3.4 | 0.15 | 65.4 |
| 7 | 60 | Mixed | 62.7 | 13.1 | — | — | 20.9 |
| 8 | 60 | Mixed | 64.5 | 17.7 | — | — | 27.4 |
| 9 | 120 | Mixed | 68.1 | 20.9 | — | — | 30.7 |
| 11 | 5 | Microagg | 50.6 | 0.4 | 14.8 | 0.11 | 0.7 |
| 11 | 10 | Microagg | 55.9 | 5.3 | 12.0 | 0.13 | 9.5 |
| 12 | 15 | Microagg | 61.1 | 13.0 | 10.1 | 0.14 | 21.3 |
| 13 | 24 | Microagg | 65.5 | 21.9 | 7.0 | 0.14 | 33.4 |
| 14 | 27 | Microagg | 75.1 | 56.4 | 2.5 | 0.14 | 75.1 |
| 15 | 30 | Microagg | 73.1 | 50.3 | 3.8 | 0.15 | 68.8 |
| 16 | 60 | Microagg | 72.8 | 49.6 | 2.5 | 0.14 | 68.1 |
| 17 | 8 | Pellets | 58.8 | 7.8 | 10.9 | 0.12 | 13.2 |
| 18 | 10 | Pellets | 60.4 | 13.7 | 10.5 | 0.12 | 22.7 |
| 19 | 16 | Pellets | 70.4 | 34.0 | 0.6 | 0.14 | 48.3 |
| 20 | 26 | Pellets | 71.6 | 44.4 | 2.9 | 0.14 | 62.0 |
| 21 | 60 | Pellets | 67.4 | 20.1 | 0.3 | 0.12 | 29.8 |

% Fe$^T$ = total iron, in wt %
% Fe$^{met}$ = metallic iron in wt %
% Metal'n = % metallisation of iron, in wt %

With reference to Table 3, samples 1 to 9 are the mixture of iron ore fines and coal, samples 10 to 16 are the micro-agglomerates, and samples 17 to 21 are the pellets.

The maximum metallisation of the mixture of iron ore fines and coal was similar to that for the pellets. Sample 5 reported a metallisation of 64.9% with a residence time of 33 minutes for the mixture of iron ore and coal. This metallisation compares favourably with a metallisation of 62% for the pellets of sample 20 which was achieved after a residence time of 26 minutes.

With the exception of sample 6, an increase in the residence time above 33 minutes for sample 5 and 26 minutes for sample 20 did not result in an improvement in metallisation for the mixture of iron ore fines and coal and for the pellets. In the case of sample 6, the improvement in metallisation was only marginal.

It was expected that the exposed surfaces of the samples of the mixture of iron ore fines and coal would be subject to sintering and possibly fusion, which would inhibit movement of reaction or product fines into or from the bed. After each trial, solid state sintering was observed, but extensive cracking also occurred throughout the depth of the sample beds which allowed adequate gas/solid contact for metallisation to occur. The bed material was friable and easily removed from the sample tray. Mineralogical examination of samples of the mixture of iron ore fines and coal showed that metallisation was fairly uniform throughout the samples. There were no indications of melting and the samples were very open and porous.

The metallisation of the micro-agglomerates was comparable to if not better than both the samples of the mixture of iron ore fines and coal and the pellets, with a maximum metallisation of 75.1 % achieved after 27 minutes residence time for sample 14. Table 3 shows that extending the test duration from 27 to 60 minutes did not improve the metallisation. Similar to the samples of the mixture of iron ore fines and coal, extensive cracking occurred in the exposed surfaces of the micro-agglomerates, allowing gas penetration throughout the bed. Furthermore, the bed material was friable with discrete micro-agglomerates visible.

In summary, the first experimental program established that the performance of the samples of the mixture of iron ore fines and coal and the micro-agglomerates was at least comparable to that of the FASTMET pellets for the given experimental conditions.

The second experimental program followed the same sample preparation procedure as the first experimental program. Whilst a number of samples were prepared using Yandicoogina iron ore (as in the first experimental program), a number of other samples were prepared using direct shipping ore (DSO)—which is a mixture of iron or fines produced by Hamersley Iron Pty. Ltd. All of the samples were prepared with the same anthracite coal and binder (where required) as used in the first experimental program.

Instead of using a high temperature electrically heated furnace, the samples were reduced in the second experimental program in a purpose built 40 KW induction furnace. As with the first experimental program, the samples were placed in a tray in the furnace for periods of time from 5 to 120 minutes. The tray was loaded with a monolayer of pellets, or a 25 mm deep bed of pellets or micro-agglomerates. The furnace was operated at temperatures ranging from 1190 to 1260° C.

The experimental products from the furnace were assayed for total iron, metallic iron, carbon and sulphur.

The results of the second experimental program are set out in Table 4.

TABLE 4

Tests Conducted in Induction Furnace

| Sample No. | Time (mins) | Feed Material | Assays | | | | % Metal'n |
|---|---|---|---|---|---|---|---|
| | | | % $Fe^T$ | % $Fe^M$ | C (%) | S (%) | |
| 1 | 10 | Mixed | 59.2 | 9.6 | 12.7 | 0.11 | 16.2 |
| 2 | 20 | Mixed | 59.6 | 15.1 | 10.9 | 0.12 | 25.3 |
| 3 | 20 | Mixed | 69.1 | 41.5 | 5.7 | 0.15 | 60.1 |
| 4 | 20 | Mixed | 74.8 | 62.0 | 5.6 | 0.14 | 82.9 |
| 5 | 30 | Mixed | 76.5 | 58.1 | 5.3 | 0.16 | 75.9 |
| 6 | 40 | Mixed | 74.8 | 56.4 | 5.0 | 0.09 | 75.4 |
| 7 | 40 | Mixed | 76.1 | 58.8 | 6.1 | 0.16 | 77.3 |
| 8 | 10 | Microagg | 62.3 | 25.9 | 9.0 | 0.13 | 41.6 |
| 9 | 20 | Microagg | 68.4 | 39.7 | 7.7 | 0.14 | 58.0 |
| 10 | 40 | Microagg | 64.9 | 29.8 | 3.2 | 0.15 | 45.9 |
| 11 | 20 | Pellets | 67.8 | 46.7 | 6.0 | 0.12 | 68.9 |
| 12 | 20 | Pellets | 77.4 | 66.0 | 3.3 | 0.13 | 85.3 |
| 13 | 30 | Pellets | 76.3 | 65.2 | 4.9 | 0.15 | 85.5 |
| 14 | 40 | Pellets | 64.9 | 32.8 | 3.2 | 0.25 | 50.5 |
| 15 | 40 | Pellets | 77.5 | 61.4 | 3.1 | 0.14 | 79.2 |

$Fe^T$ = total iron, in wt %
$Fe^M$ = metallic iron, in wt %
% Metallisation = % metallisation of iron, in wt %

With reference to Table 4, samples 1 to 7 are the mixture of iron ore fines and coal, samples 8 to 10 are the micro-agglomerates, and samples 11 to 15 are the pellets.

The metallisation of a number of the samples of the mixture of iron ore fines and coal and the pellets was significantly higher than that of the micro-agglomerates. In large part, this was due to higher furnace temperatures. For example, the maximum operating temperatures of the furnace for pellets samples 12, 13 and 15 were in the range of 1255 to 1265° C. whereas the maximum operating temperatures of the micro-agglomerate samples 8 to 10 was in the range of 1190 to 1200° C.

Taking into account the different furnace operating temperatures, the results of the second experimental program were similar to that of the first experimental program.

The at least partially reduced iron ore produced by the process and apparatus of the present invention can be used in a wide range of applications.

A preferred application is the production of metallic iron in an integrated process in which iron ore fines, coal fines, and binder are mixed together in required proportions, and the mixture of feed materials is then agglomerated to form micro-agglomerates. The micro-agglomerates are oven-dried and screened to separate a fraction in the range of 500 to 1400 micron. This fraction is then fed to a rotary hearth furnace operated at a temperature range of 1250 to 1350° C. In the furnace the iron ore in the micro-agglomerates is reduced, with at least a part of the iron ore being reduced to metallic iron. The reduction is accomplished by the intimate contact of the carbon and iron oxide in the micro-agglomerates in the high temperature environment of the furnace. The metallised product is discharged from the furnace and transferred to a HIsmelt smelt reduction vessel (or other suitable apparatus) to complete reduction of partially metallised micro-agglomerates and to melt the metallised product to produce a molten iron bath that is tapped periodically.

It is noted that the present invention is not restricted to this application, and the at least partially reduced iron ore product discharged from the furnace may be used in a number of other applications.

Many modifications may be made to the present invention as described without departing from the spirit and scope of the invention.

What is claimed is:

1. A process for at least partially reducing iron oxides comprises:

(i) forming a bed of reactants on a hearth of a rotary hearth furnace, the reactants comprising micro-agglomerates of iron ore fines and particulate carbonaceous material, the micro-agglomerates having a diameter of between 500 and 1400 micron; and (ii) heating the micro-agglomerates in the rotary hearth furnace to at least partially reduce the iron oxides.

2. The process defined in claim 1 wherein micro-agglomerates form a substantial proportion of the bed of reactants in step (i).

3. A process for producing metallic iron comprises:

(i) producing at least partially reduced iron oxides by forming a bed of reactants on a hearth of a rotary hearth furnace, the reactants comprising:

micro-agglomerates of iron ore fines and particulate carbonaceous material, the micro-agglomerates having a diameter of between 500 and 1400 micron;

and heating the micro-agglomerates in the rotary hearth furnace to at least partially reduce the iron oxides; and (ii) completing reduction of the iron oxides and melting the metallic iron in a smelt reduction vessel.

* * * * *